(12) United States Patent
Choquette

(10) Patent No.: US 9,829,148 B2
(45) Date of Patent: Nov. 28, 2017

(54) ROTATABLE PLATTER FOR A MONITOR HAVING A PASSAGE FOR WIRING AND A STOPPER

(71) Applicant: Samuel Choquette, Terrebonne (CA)

(72) Inventor: Samuel Choquette, Terrebonne (CA)

( * ) Notice: Subject to any disclaimer, the term of this patent is extended or adjusted under 35 U.S.C. 154(b) by 0 days.

(21) Appl. No.: 15/278,136

(22) Filed: Sep. 28, 2016

(65) Prior Publication Data

US 2017/0097116 A1    Apr. 6, 2017

(30) Foreign Application Priority Data

Oct. 3, 2015 (GB) .................................. 1517487.3

(51) Int. Cl.
*F16M 11/20* (2006.01)

(52) U.S. Cl.
CPC ... *F16M 11/2014* (2013.01); *F16M 2200/024* (2013.01)

(58) Field of Classification Search
CPC combination set(s) only.
See application file for complete search history.

(56) References Cited

U.S. PATENT DOCUMENTS

| | | | |
|---|---|---|---|
| 2,779,642 A | 1/1957 | Matthews | |
| 3,572,861 A | 3/1971 | Rogers, Jr. et al. | |
| 4,117,627 A | 10/1978 | Slingerland, Jr. | |
| 4,483,503 A | 11/1984 | Gahan | |
| 4,526,336 A | 7/1985 | Durivault et al. | |
| 4,547,027 A * | 10/1985 | Scheibenreif .......... | F16M 11/10 248/349.1 |
| 4,566,664 A | 1/1986 | Donald | |
| 4,589,713 A * | 5/1986 | Pfuhl .................... | F16M 11/126 248/349.1 |
| 4,629,181 A | 12/1986 | Krive | |
| 4,640,485 A * | 2/1987 | Day ....................... | F16M 11/18 248/183.4 |
| 4,697,778 A | 10/1987 | Harashima | |
| 4,946,127 A | 8/1990 | Kulaga | |
| 5,024,415 A | 6/1991 | Purens | |
| 5,080,322 A | 1/1992 | Harley | |
| 5,569,895 A * | 10/1996 | Lynch .................... | F16M 11/10 235/1 R |
| 6,010,111 A * | 1/2000 | Cho ....................... | F16M 11/10 248/346.06 |
| 6,024,335 A * | 2/2000 | Min ....................... | F16M 11/10 248/183.1 |
| 6,050,535 A * | 4/2000 | Kang ..................... | F16M 11/10 248/371 |
| 6,105,919 A * | 8/2000 | Min ....................... | F16M 11/10 248/418 |
| 6,116,560 A * | 9/2000 | Kim ....................... | F16M 11/10 248/346.01 |

(Continued)

*Primary Examiner* — Lisa Lea Edmonds

(57) ABSTRACT

A rotatable platter for monitors comprising a platter member fixedly attached to a rotating plate member. The rotating plate member is connected, by way of an annular ball bearing member to a fixed plate member. An opening made through a center portion of the platter member allows for at least one cable to pass therethrough. The cable passes through a hollow opening forming part of the annular annular ball bearing. A peg engaging one of two possible channels controls the degree of allowable rotation of the platter member.

5 Claims, 4 Drawing Sheets

(56) References Cited

U.S. PATENT DOCUMENTS

| | | | | |
|---|---|---|---|---|
| 6,135,411 | A * | 10/2000 | Shirasawa | F16M 11/10 248/349.1 |
| 6,801,426 | B2 * | 10/2004 | Ichimura | F16M 11/08 248/349.1 |
| 8,109,486 | B2 * | 2/2012 | Gong | G06F 1/1656 248/220.1 |
| 8,199,498 | B2 * | 6/2012 | Wang | G06F 1/1656 248/638 |
| 8,213,177 | B2 * | 7/2012 | Uttermann | G06F 1/166 248/188.8 |
| 8,264,839 | B2 * | 9/2012 | Shen | H05K 5/0204 248/188.8 |
| 2009/0175001 | A1 * | 7/2009 | Mathew | A47B 91/00 361/679.59 |

* cited by examiner

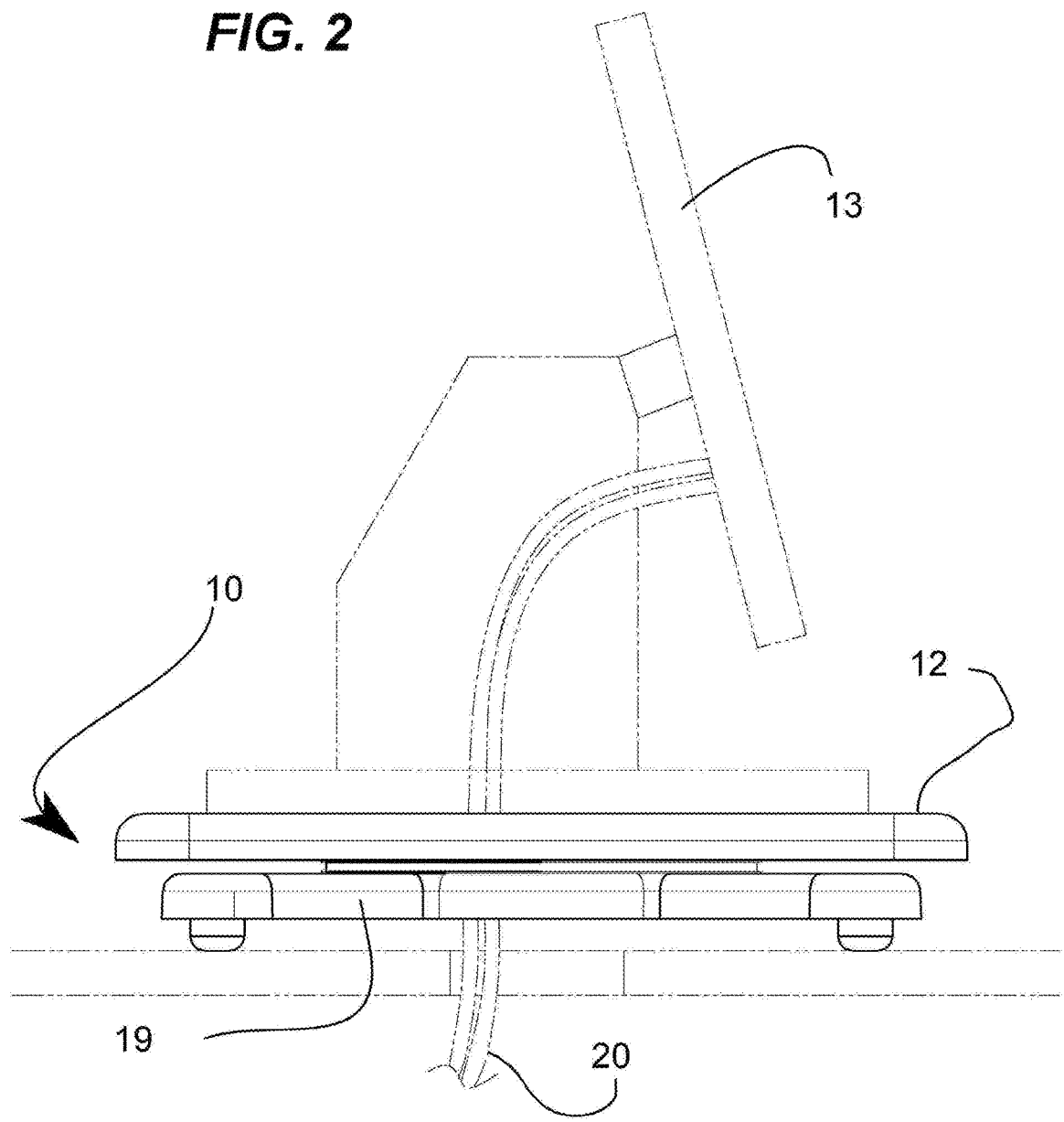

FIG. 3A
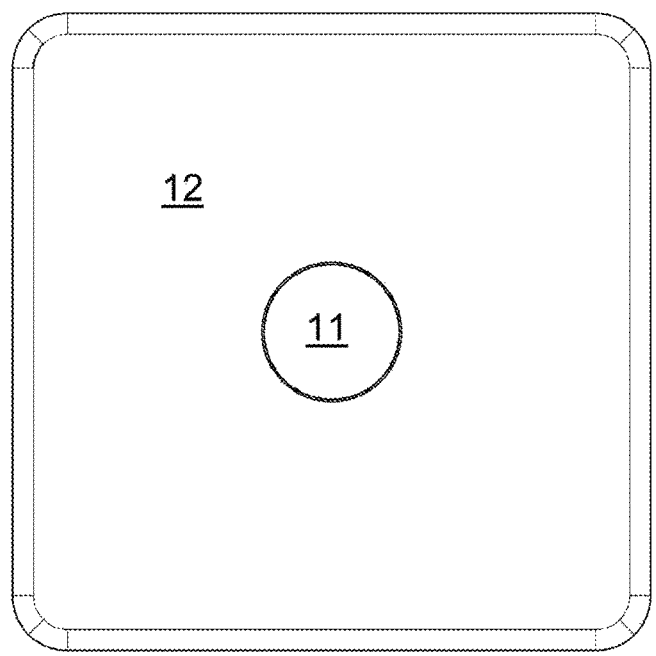
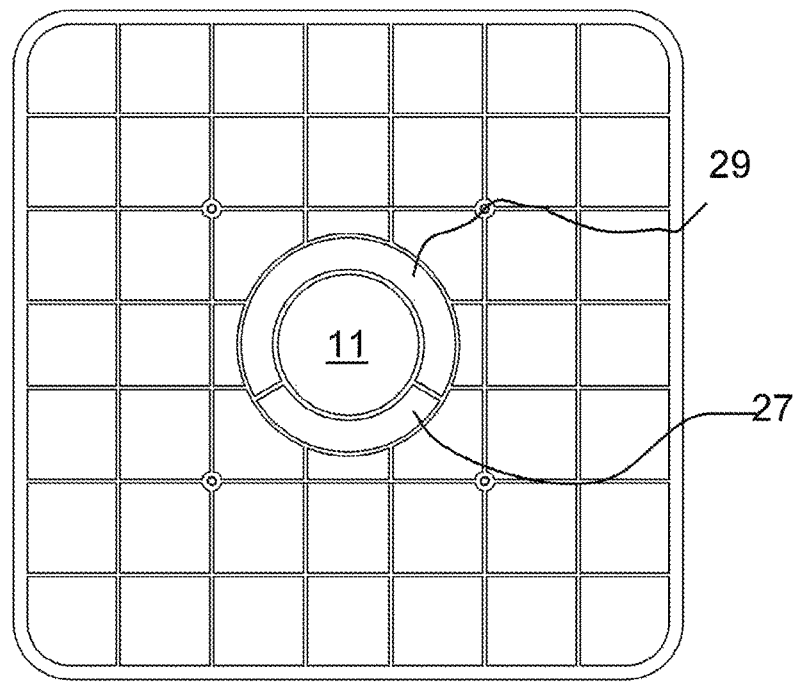
FIG. 3B

FIG. 4A
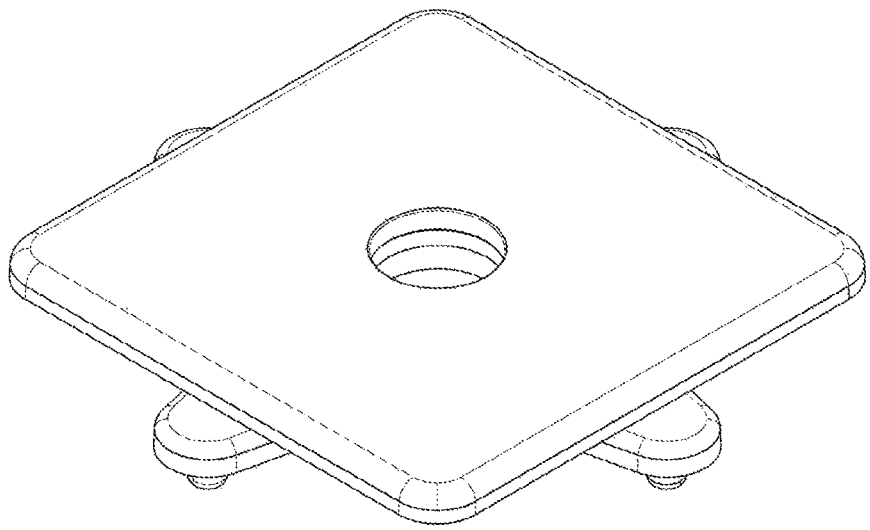
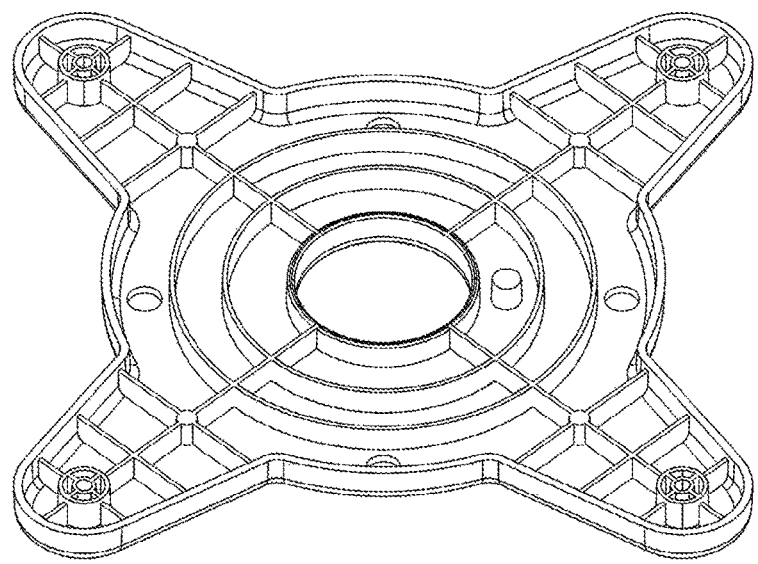
FIG. 4B

ROTATABLE PLATTER FOR A MONITOR HAVING A PASSAGE FOR WIRING AND A STOPPER

FIELD OF THE INVENTION

The present invention relates generally to furniture accessories but more particularly to a rotatable platform for a monitor having a passage for wiring and a stopper.

BACKGROUND OF THE INVENTION

There are many rotatable platters for use with televisions and other types of monitors. In some cases, these rotatable platters have a stopper means to limit the range of rotation of the platter. Typically, two metal plates rotate relative to each other by way of ball bearings and a rivet or other such mechanical means to connect both plates at the axis of rotation. Very few have a hole located above their rotational axis to allow for the passage of cables because the metal plates prevent the vertical passage of cables. They simply pass to the side of the platter, which makes them independent from it but it also makes the cable move as the platter is being moved, requires the cables to have some slack, which makes them harder to tidy up,

SUMMARY OF THE INVENTION

In view of the foregoing disadvantages inherent in the known devices now present in the prior art, the present invention, which will be described subsequently in greater detail, is to provide objects and advantages which are:

To provide for a rotatable platter with a centrally located hole to allow for the passage of cables as well as a stopper means to limit the movement of cables. The device requires very like slack in the cable, and makes the cables easier to hide and tidy up.

In order to do so, the invention comprises a platter member fixedly attached to a rotating plate member, the rotating plate member being connected, by way of an annular ball bearing member to a fixed plate member. An opening made through a center portion of the platter member allowing for at least one cable to pass therethrough. The at least one cable passing through a hollow opening forming part of the annular ball bearing.

The fixed plate member being mechanically fastened by way of mechanical fasteners onto a base member.

The at least one cable passing through a base opening made through the base member.

A stopper peg located on the base member engages one of two possible channels located on the underside of the platter member to restrict the range of rotation of the platter member to either a 120 degree range or a 240 degree range, depending upon which channel a user places the peg in.

Levelling pads are located underneath the base plate member.

The invention is used in combination with a monitor resting on the platter member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIG. 2 Side view of the invention with a monitor on it.
FIGS. 3a-b Top and bottom views of the platter.
FIGS. 4a-b Isometric view of the invention and bottom view of the base member.

DETAILED DESCRIPTION

Figure 1:
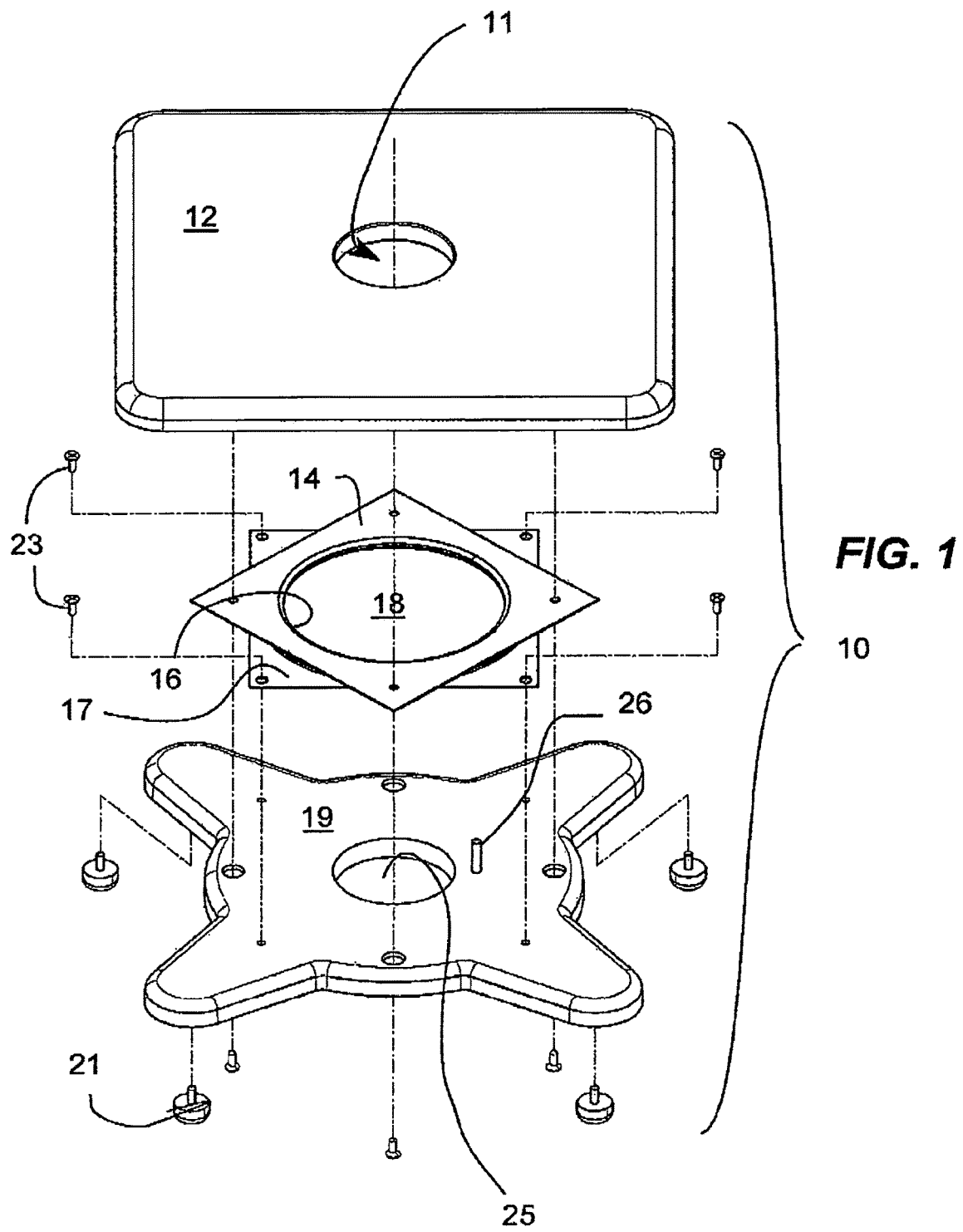
FIG. 1 Exploded view of the invention.

A rotatable platter for visual display (10) is comprised of a platter member (12) fixedly attached to a rotating plate member (14) connected, by way of an annular ball bearing member (16) that interfaces between the rotating plate member (14), and to a fixed plate member (17) which is itself mechanically fastened by way of mechanical fasteners (23) onto a base member (19). An opening (11) made through the center of the platter member (12) allows for one or more cables (20) to pass therethrough, but also through a hollow opening (18). The cable (20) also goes through a base opening (25) made through the base member (19).

A stopper peg (26) located on the base member (19) engages either a first channel (27), located on the underside of the platter member (12), which gives it a range of rotation of about 120 degrees, or the peg (26) engages a second channel (29) which gives it a range of about 240 degrees. A user can select which channel by manually lifting the platter member (12) and relocating it in such a way that the peg (26) will engage the user selected channel (27, 29).

Levelling pads (21), which can be used for levelling purposes, are located underneath the base plate member (19).

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A rotatable platter for monitors comprising a platter member fixedly attached to a rotating plate member, said rotating plate member being connected, by way of an annular ball bearing member to a fixed plate member; an opening made through a center portion of said platter member allowing for at least one cable to pass therethrough; said at least one cable passing through a hollow opening forming part of said annular ball bearing; said fixed plate member being mechanically fastened by way of mechanical fasteners onto a base member; said at least one cable passing through a base opening made through said base member; a stopper peg located on said base member engages, based on a user's choice, either a first channel, or a second channel, wherein both said channels are located on an underside portion of said platter member; said first channel designed for limiting a range of rotation of said platter member to approximately 120 degrees when said peg is engaged within said first channel, and said second channel designed for limiting said range of rotation of said platter member to approximately 240 degrees when said peg is engaged within said second channel.

2. The rotatable platter as in claim 1 wherein levelling pads are located underneath said base member.

3. A combination of a monitor and a rotatable platter for monitors comprising a monitor resting atop a platter member fixedly attached to a rotating plate member, said rotating plate member being connected, by way of an annular ball bearing member to a fixed plate member; an opening made through a center portion of said platter member allowing for at least one cable to pass therethrough; said at least one cable passing through a hollow opening forming part of said annular ball bearing; said fixed plate member being mechanically fastened by way of mechanical fasteners onto a base member; said at least one cable passing through a base opening made through said base member; a stopper peg located on said base member engages, based on a user's choice, either a first channel, or a second channel, wherein both said channels are located on an underside portion of said platter member; said first channel designed for limiting a range of rotation of said platter member to approximately 120 degrees when said peg is engaged within said first channel, and said second channel designed for limiting said range of rotation of said platter member to approximately 240 degrees when said peg is engaged within said second channel.

4. The combination of claim 3 wherein levelling pads are located underneath said base member.

5. A method of selecting a range of rotation in a rotatable platter for monitors as in claim 1 consisting in the steps of: a user manually lifting said platter member and relocating said platter member so that said peg engages one of two possible channels.

* * * * *